US012601324B2

(12) United States Patent
Raffuzzi et al.

(10) Patent No.: US 12,601,324 B2
(45) Date of Patent: Apr. 14, 2026

(54) OFFSHORE FLOATING PLATFORM FOR AEOLIAN GENERATORS

(71) Applicant: MC2WORLD S.R.L., Bologna (IT)

(72) Inventors: Mirco Armando Raffuzzi, Cervia (IT); Lorenzo Battisti, Trento (IT)

(73) Assignee: MC2WORLD S.R.L., Bologna (IT)

( * ) Notice: Subject to any disclaimer, the term of this patent is extended or adjusted under 35 U.S.C. 154(b) by 1 day.

(21) Appl. No.: 18/865,634

(22) PCT Filed: May 11, 2023

(86) PCT No.: PCT/IB2023/054885
§ 371 (c)(1),
(2) Date: Nov. 13, 2024

(87) PCT Pub. No.: WO2023/218401
PCT Pub. Date: Nov. 16, 2023

(65) Prior Publication Data
US 2025/0314239 A1     Oct. 9, 2025

(30) Foreign Application Priority Data
May 13, 2022     (IT) ......................... 102022000009917

(51) Int. Cl.
*F03D 13/25*          (2016.01)
*F03D 7/02*           (2006.01)
(52) U.S. Cl.
CPC ......... *F03D 13/256* (2023.08); *F03D 7/0204* (2013.01); *F05B 2240/93* (2013.01); *F05B 2240/95* (2013.01); *F05B 2240/96* (2013.01)

(58) Field of Classification Search
CPC .. F03D 13/256; F03D 7/0204; F05B 2240/93; F05B 2240/95; F05B 2240/96
See application file for complete search history.

(56) References Cited

U.S. PATENT DOCUMENTS

| | | | |
|---|---|---|---|
| 2011/0074155 A1 | 3/2011 | Scholte-Wassink | |
| 2015/0211477 A1 | 7/2015 | Wright | |
| (Continued) | | | |

FOREIGN PATENT DOCUMENTS

| | | |
|---|---|---|
| CA | 2747541 A1 | 6/2010 |
| CN | 202110669421 A | 6/2021 |
| (Continued) | | |

OTHER PUBLICATIONS

International Search Report and Written Opinion dated Jul. 28, 2023, issued in PCT Application No. PCT/IB2023/054885, filed May 11, 2023.

(Continued)

*Primary Examiner* — Viet P Nguyen
(74) *Attorney, Agent, or Firm* — Workman Nydegger

(57) ABSTRACT

An offshore floating platform includes a plurality of aeolian generators having: an aeolian tower having a longitudinal extension and provided with a first and a second end; a blade-type aeolian generator positioned at the first end; and an engagement base positioned at the second end; a connection section, which joins two aeolian generators, including at least one connection element; wherein each engagement base is engaged with the connection element in such a way that each aeolian tower can move independently in a direction substantially parallel to the axis of longitudinal development of an aeolian tower.

8 Claims, 7 Drawing Sheets

(56)                    References Cited

U.S. PATENT DOCUMENTS

| 2015/0259050 A1 | 9/2015 | Tunbjer |
| 2020/0392946 A1 | 12/2020 | Wong |

FOREIGN PATENT DOCUMENTS

| DE | 32 24 976 A1 | 1/1984 | | |
| DE | 102 19 062 A1 | 11/2003 | | |
| EP | 3 885 575 A1 | 9/2021 | | |
| NL | 1 008 318 C2 | 8/1999 | | |
| WO | 2011/049843 A2 | 4/2011 | | |
| WO | WO-2014015998 A1 * | 1/2014 | ............ | F03D 13/25 |
| WO | 2016/007076 A1 | 1/2016 | | |

OTHER PUBLICATIONS

Italian Search Report dated Jan. 18, 2023, issued in Italian Application No. 102022000009917, filed May 13, 2022.

* cited by examiner

OFFSHORE FLOATING PLATFORM FOR AEOLIAN GENERATORS

FIELD OF THE INVENTION

The present invention relates, in general, to the field of renewable energy. In particular, the present invention concerns an offshore floating platform comprising aeolian generators.

DESCRIPTION OF THE PRIOR ART

As is known, several solutions currently exist for the construction of marine floating platforms for aeolian generators. For example, experimental solutions have been developed which are known as "spar-buoy" platforms and "tension leg" platforms (TLP), as well as "semisubmersible" platforms with a triangular structure.

Each one of such solutions has some drawbacks. For example, the Applicant has noticed that, due to intrinsic environmental conditions, offshore installation of an aeolian tower is very difficult and particularly costly when using spar-buoy solutions; as regards tension-leg solutions, the Applicant has noticed that further difficulties are encountered, caused by the necessity of obtaining a partial sinking of the structure (which is necessary for this solution to work) under cost-effective and safe conditions; triangular or semisubmersible solutions are, on the other hand, very expensive.

The Applicant has also noticed that such solutions only permit the installation and use of one aeolian tower per platform. The installation of more than one aeolian tower on a single structure resulted in ineluctable problems of generator efficiency. Such problems for example, to the unavoidable slipstream alignment of multiple towers, or to gigantism problems, since the need for maintaining proper slipstream distances between successive aeolian towers implies the use of huge and costly structures.

Disadvantageously, the above-described limitations have led to covering very large marine areas in order to be able to fulfil today's high power requirements.

The Applicant observes that, in order to overcome this latter problem, floating platforms have been developed, with different constructions, which can carry multiple aeolian towers. Disadvantageously, such platforms suffer from a number of problems, ranging from slipstream interference, affecting some construction types, to difficulties in building a structure which is both economical and capable of withstanding the stresses caused by offshore installation: such structures may be several hundreds of metres long, i.e. longer than many ships, and the strength aspect must not be neglected, especially in combination with the need for keeping costs at sustainable levels in order to attain cost-effective power production.

Document CA2747541A describes aeolian generators lying in a plane, optionally anchored by means of a mooring system.

Document CN202110669421A describes aeolian generators arranged in multiple rows.

Document SE2015050740W describes aeolian generators lying in a plane, so anchored as to be able to place themselves into an optimal position according to the wind direction.

Document US2010052998W describes aeolian generators arranged in multiple rows and in multiple planes, or on floating structures comprising nodes rigidly connected to each other.

Document US202016882514A describes aeolian generators arranged in a triangle fashion, wherein the platform is correctly oriented by the wind alone, under the forces exerted by the wind on the generators, without the aid of any auxiliary components, resulting in a broad margin of error in the optimal position.

Document US201213451249A describes aeolian generators arranged in multiple rows, forming a "V".

Document US201514681025A describes aeolian generators positioned along a circumference.

Document DE3224976A1 describes aeolian generators with no axis parallelism constraint, positioned along a circumference and connected by means of mutually hinged simple rods (as opposed to parallelogram connections).

Document US2015/259050A1 describes aeolian generators positioned on a regular polygon, with adjustable polygon geometry.

Document DE10219062A1 describes a multitude of rotor-type generators arranged in groups at different heights: such generators seem to be connected by means of simple hinges or ball joints.

Document EP3885575A1 claims the use of sensors and computers for the purpose of orienting rotors, blades and nacelles according to the wind direction, taking into account the position of the platform.

Document NL1008318C2 describes aeolian generators positioned on a regular polygon rotatable by means of propeller engines.

Document US2011/074155A1 describes a single-generator floating platform, which can be moved laterally by means of a propeller engine.

BRIEF DESCRIPTION OF THE INVENTION

It is one object of the present invention to provide an articulated floating platform wind turbines, which can simultaneously house multiple generators with no slipstream-induced efficiency decrease.

It is a further object of the present invention to provide an articulated floating platform for wind turbines which is durable and resistant to extreme offshore weather conditions.

In particular, the present invention provides an offshore floating platform comprising:

a plurality of aeolian generators, each aeolian generator comprising: an aeolian tower having a longitudinal extension and provided with a first and a second end; a blade-type aeolian generator positioned at a first end; an engagement base positioned at the second end;

a connection section, which joins two aeolian generators, comprising at least one connection element.

Each engagement base is engaged with the connection element in such a way that each aeolian tower can move independently in a direction substantially parallel to the axis of longitudinal development of an aeolian tower.

Advantageously, the articulated construction, i.e. the presence of connection sections that permit a substantially vertical movement of the aeolian towers, allows the platform to adapt itself to the wave motion, which may be more or less intense, e.g. caused by adverse weather conditions, thereby increasing the mechanical strength of the structure as a whole.

The term "aeolian generator" generally refers, in the present invention, to an energy generator exploiting the wind (also known as "aerogenerator"), e.g. a wind turbine, of any kind, whether with a vertical axis. The Applicant observes that, advantageously, vertical-axis wind turbines permit building a more compact platform, since they require shorter slipstream distances.

Advantageously, the substantially vertical movement generated by the wave motion of the aeolian tower induces vertical velocity components on the rotor, which can be better absorbed by the rotor of a vertical-axis wind turbine.

Preferably, each connection section further comprises at least one intermediate node engaged with two successive connection elements.

Preferably, each intermediate node is free to move in a direction substantially parallel to the axis of longitudinal development of an aeolian tower.

The substantially vertical movements of each intermediate node and/or of each aeolian tower being preferably independent of each other.

The Applicant observes that, according to the present invention, the expression "substantially vertical movements independent of each other" means that, for example, two aeolian towers and/or two intermediate nodes and/or one intermediate node and one aeolian tower can move substantially vertically in two opposite directions. For example, due to the wave motion of the sea, an intermediate node may move vertically downwards (at a wave bottom) while, simultaneously, an aeolian tower may move vertically upwards (at a wave crest).

Preferably, each intermediate node is connected to two respective connection elements in such a way that a first connection element and a second connection element are so arranged, in a plan view, as to form an angle of 120° to 230°, preferably an angle of 180°.

Advantageously, the articulated floating platform system permits the installation of multiple aeolian generators on the same structure, without them being mutually affected by their slipstreams.

Preferably, each connection element is engaged, by means of a respective connection plate, with:

either an intermediate node or an engagement base at a first end, and either a further intermediate node or an engagement base at a second end.

Advantageously, two adjacent aeolian towers can be connected by means of a plurality of intermediate nodes, permitting the use of connection elements having a longitudinal development length which is shorter than the length of a blade of the aeolian generator.

Preferably, each connection element comprises a plurality of tubular elements that are parallel to each other.

Advantageously, the use of a plurality of parallel tubular elements makes it possible to obtain a strong structure opposing any movements of the aeolian towers that might jeopardize the stability of the structure.

Preferably, the plurality of tubular elements and the connection plates form an articulated parallelogram. In other words, each connection element is connected to two plates, thus forming an articulated parallelogram.

Even more preferably, each connection element comprises at least three tubular elements that are parallel to each other.

Preferably, each tubular element is engaged, at one end thereof, with a connection plate by means of: a hinge or a ball joint or a cardan joint.

Advantageously, each articulated parallelogram allows each intermediate node and each aeolian tower to move substantially vertically, i.e. along a direction substantially parallel to an axis parallel to the axis of longitudinal development of an aeolian tower. Such vertical movements allow the platform to adapt itself to the wave motion of the sea, thereby preventing the platform from collapsing.

Preferably, the connection plates (usually welded) can be connected to the intermediate nodes and/or to the engagement bases of an aeolian tower by means of a hinge-type connection (not shown).

Advantageously, such a hinge has its axis of rotation perpendicular to the axis of longitudinal development of the aeolian tower, so as to allow the latter to rotate slightly, e.g. about said perpendicular axis, by an angle ranging from −10° to +10°, even more preferably from −5° to +5°, thus saving the connection element from torsional stresses caused by adverse marine conditions.

Advantageously, the platform according to the present invention, which comprises vertically moving intermediate nodes and aeolian towers, mutually connected by means of articulated parallelograms, ensures parallelism of the axes of the aeolian towers by always keeping them substantially perpendicular to the average sea level.

In particular, advantageously, the Applicant has surprisingly observed that an articulated parallelogram structure like the one described above permits a variation in the angle between the axis of longitudinal development (i.e. the vertical axis) of an aeolian tower and the axis of longitudinal development of a tubular element within a range of 70° to 110°, preferably 80° to 100°, without jeopardizing the structural stability of the floating platform, such a platform being thus also suitable for offshore installation.

Advantageously, considering the same installed power, significantly smaller sea areas need to be occupied, with beneficial effects on both ecology and navigation.

Advantageously, the presence of tubular elements as described above makes it possible to build a floating platform made up of assemblable parts, each part being much smaller than the entire structure, so that each element (i.e. intermediate nodes, aeolian generators, connection elements and connection plates) can be manufactured separately and then assembled together.

Preferably, the tubular elements of a respective connection element are mutually connected by means of respective elastic elements.

Preferably, the elastic elements are mutually collaborative.

Preferably, the elastic elements are selected among: traction springs, spring cylinders, hydraulic, pneumatic or electric cylinders.

Advantageously, such elastic elements exert an elastic force opposing vertical movements caused by wave motion. In other words, such elastic elements avoid any vertical movements of the intermediate nodes and/or of the aeolian towers which might jeopardize the floating platform.

Advantageously, such elastic elements also make it possible to bring the system back into the initial geometric configuration in the absence of any stresses caused by wave motion. Moreover, such elastic elements may constitute a system for damping the relative motion of the tubular elements, or may act as stoppers for said relative motion.

Preferably, the platform further comprises an anchoring element engaged with either an intermediate node or an engagement base; the anchoring element being adapted to anchor the platform to the sea floor.

Preferably, the anchoring element comprises:

a cylindrical main body;

a slewing ring, fitted onto said cylindrical main body;

a plurality of anchoring cables;

5 the slewing ring comprising a plurality of hooking seats, each hooking seat being adapted to engage a first end of a respective anchoring cable.

Advantageously, said anchoring element allows the platform to rotate about an anchoring point.

Preferably, the cylindrical main body further comprises an upper retainer and a lower retainer; wherein the upper retainer and the lower retainer delimit a portion of the main body along which the slewing ring is free to slide.

Advantageously, a slewing ring that can freely slide along a portion of the main body will allow the anchoring element, in its turn, to follow the wave motion.

Preferably, each aeolian tower extends through the respective engagement base, presenting a lower portion; the lower portion being equipped with a damping element, preferably in the form of a perforated plate.

Preferably, the damping element is arranged perpendicular to the axis of longitudinal development of the respective aeolian tower.

Preferably, at least one intermediate node comprises a rudder driven by means of an actuator.

Preferably, the lower portion of at least one aeolian tower is equipped with a motor, more preferably a propeller engine.

Preferably, the platform further comprises a control system. The control system comprises:

one or more wind direction sensors;
one or more processors configured for:
receiving information about the wind direction from said wind direction sensor;
controlling, based on said information, each actuator and each propeller engine in such a way as to orient the platform, by causing it to rotate about the anchoring centre, as a function of the wind direction.

Advantageously, by rotating the platform as a function of the wind direction it is possible to obtain high power from each aeolian generator, thus making it cost-effective to install energy storage and/or transformation equipment on each installed platform, resulting in considerable savings.

Preferably, the processor is contained in a box-shaped body engaged with either an intermediate node or an aeolian tower. Even more preferably, said box-shaped body may contain all the auxiliary equipment and/or the systems for storing, converting and treating the produced energy (e.g. on-board electrolyzation systems for hydrogen and oxygen production), electrically connected to the aeolian generators.

Preferably, the box-shaped body is engaged with either an aeolian tower or an intermediate node by means of a further connection element and further connection plates, the further connection element and the further connection plates preferably forming an articulated parallelogram. The connection element comprising at least two tubular elements that are parallel to each other.

Advantageously, since the platform according to the present invention reduces all pitch and roll moments of the structure, it finds application in all ordinary and extraordinary maintenance situations, such as ship mooring and docking and on-board operations where variations in the working angles must be minimal.

Furthermore, for specific applications such as, for example, the use of on-board electrolyzation systems for hydrogen and oxygen production, such a system ensures less fluctuations of the levels of the liquids used in the production systems.

BRIEF DESCRIPTION OF THE DRAWINGS

The invention will become more apparent in light of the following detailed description, provided herein merely by way of non-limiting example, wherein reference will be made to the annexed drawings, wherein:

FIG. 10 shows a preferred embodiment of a connection element between an intermediate node and an aeolian tower.

The drawings are not in scale.

DETAILED DESCRIPTION OF SOME PREFERRED EMBODIMENTS

In the following, the terms "above", "under", "upper", "lower", "parallel", "perpendicular", "horizontal", "vertical", and, generally, all the terminology indicating positions and directions, refer to the annexed drawings and to the present description, and shall not be deemed to limit the practical implementation of the invention.

Figure 1:
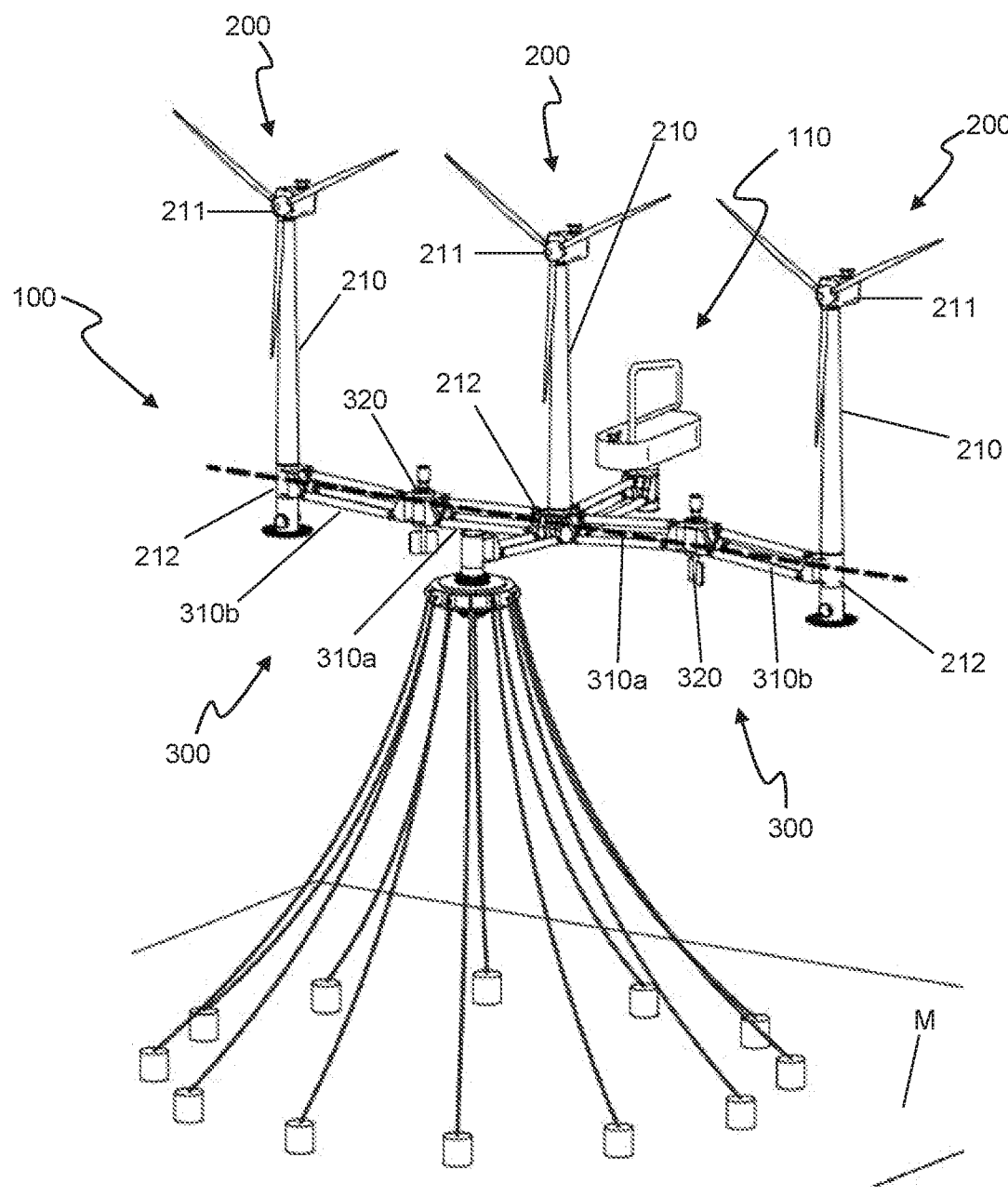
FIG. 1 is a perspective view of a multi-generator articulated floating platform according to the present invention, wherein some parts are not shown for clarity.
Figure 2:
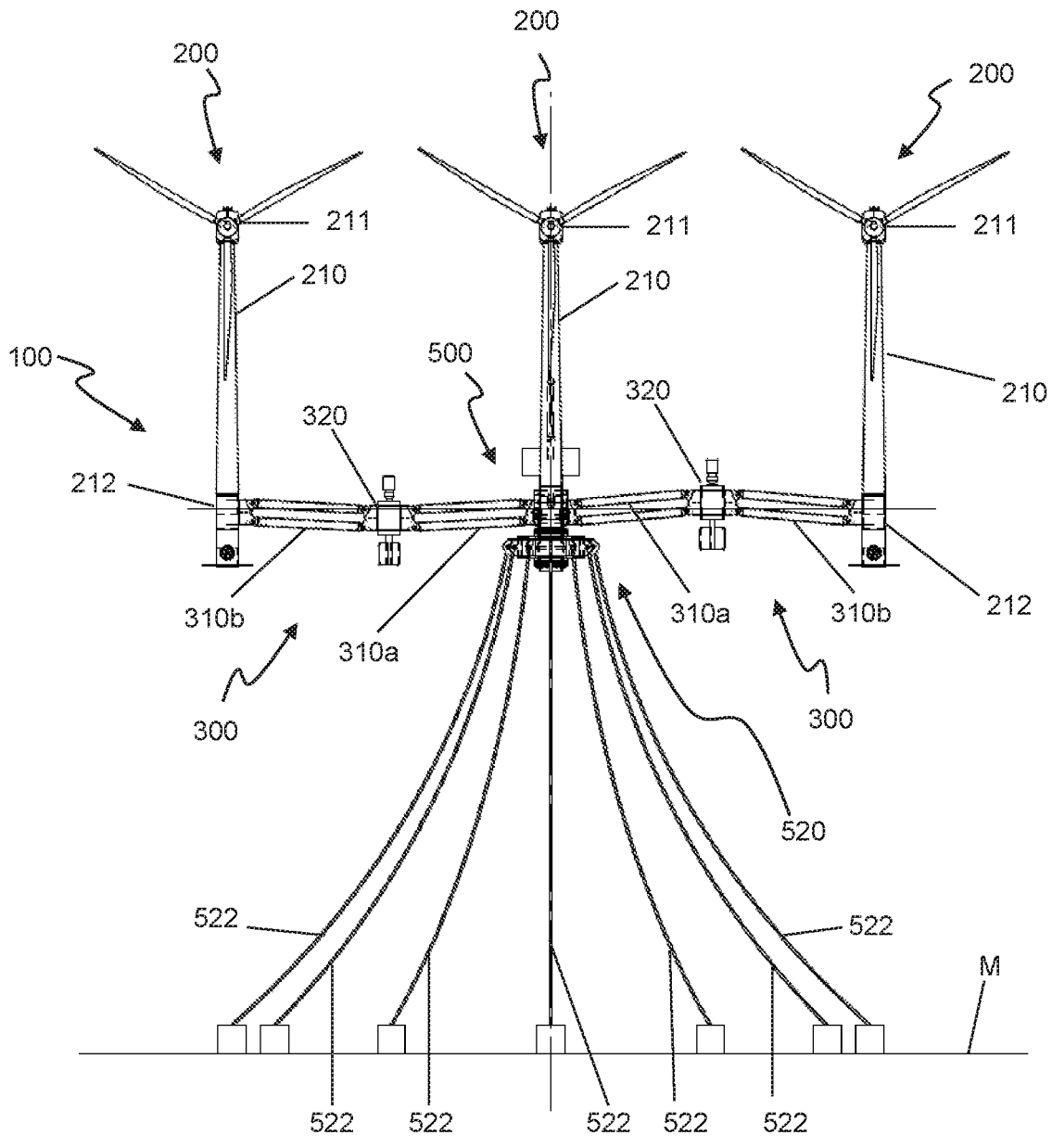
FIG. 2 is a front view of the floating platform of FIG. 1.

With initial reference to FIGS. 1 and 2, the present invention provides an offshore floating platform, hereafter designated by reference numeral 100.

The platform 100 comprises a plurality of aeolian generators 200, e.g. two or more aeolian generators 200. Each aeolian generator 200 comprises: an aeolian tower 210 having a longitudinal extension and provided with a first and a second end; a blade-type aeolian generator 211 positioned at a first end; an engagement base 212 positioned at the second end. Preferably, the blade-type aeolian generators 211 are oriented in the same direction. In other words, the rotation planes of the blades of the aeolian generators 200 are parallel to each other.

The platform 100 further comprises at least one connection section 300, which joins two aeolian generators 200.

Preferably, each connection section 300 comprises: a plurality of connection elements 310a, 310b and at least one intermediate node 320. Each intermediate node 320 is connected to two successive connection elements 310a, 310b.

Each connection element 310a, 310b is engaged with:
an intermediate node 320 and the engagement base 212 of a respective aeolian tower 210; or
two successive intermediate nodes 320 (not shown); or
two successive engagement bases 212 (not shown).

In particular, each intermediate node 320 and/or each engagement base 212 is engaged with the connection element 310a, 310b in such a way that each aeolian tower 210 and/or each intermediate node 320 can move freely in a direction substantially parallel to the axis of longitudinal development of an aeolian tower 210.

Preferably, as shown in FIGS. 1 and 2, each intermediate node 320 is connected to two respective connection elements 310a, 310b in such a way that a first connection element 310a and a second connection element 310b are so arranged, in a plan view, as to form an angle of 120° to 240°, more preferably an angle of 180°.

Figure 3:
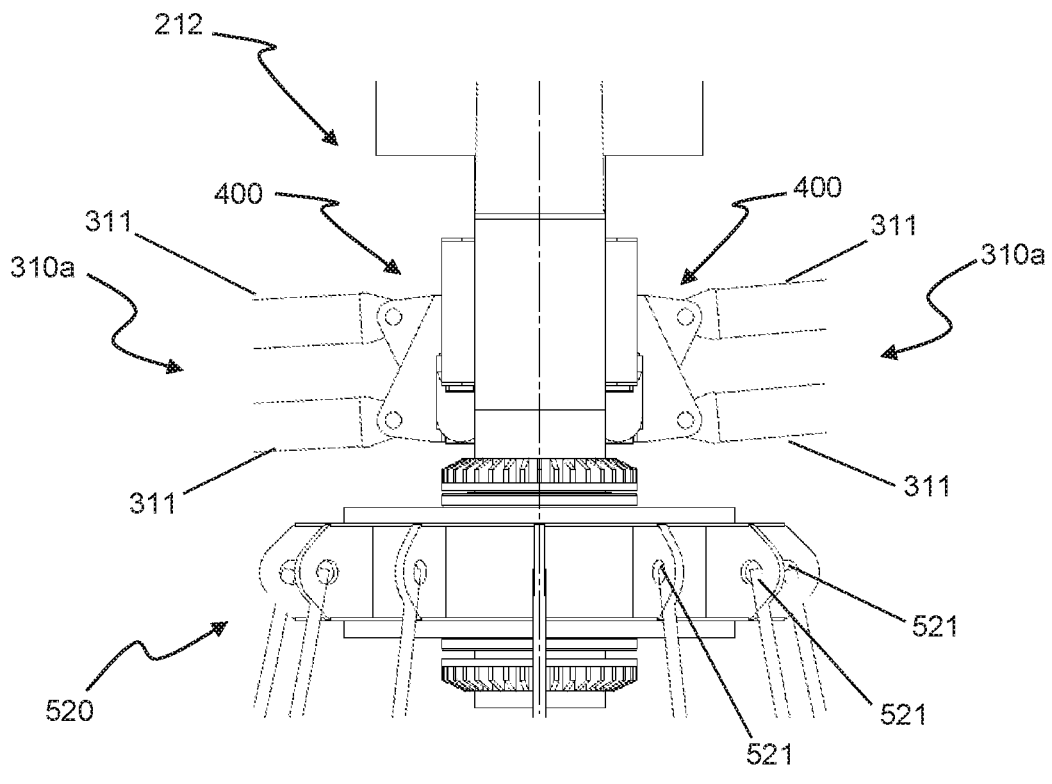
FIG. 3 is a magnified view of a detail of FIG. 2, showing an anchoring element according to a preferred embodiment of the present invention.
Figure 4:
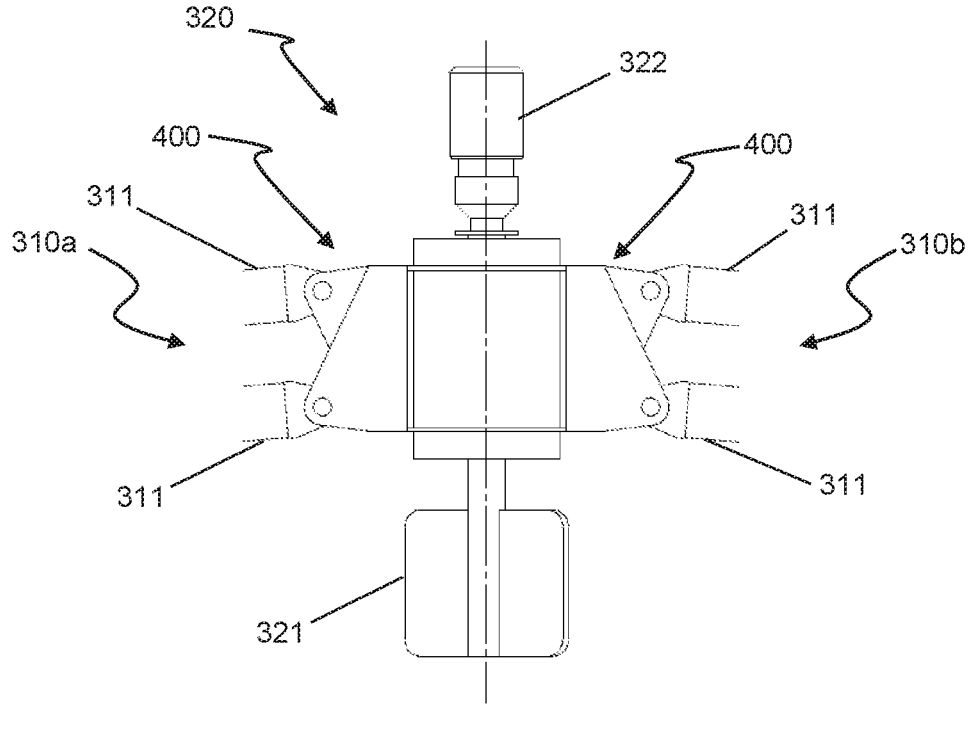
FIG. 4 is a magnified view of a detail of FIG. 2, showing an intermediate node according to a preferred embodiment of the present invention.

As shown in FIGS. 2, 3 and 4, each connection element 310a, 310b is engaged, by means of a respective connection plate 400, with:

an intermediate node 320 at a first end; and
either a further intermediate node 320 or an engagement base 212 at a second end.

The Applicant observes that the intermediate node 320 may be absent, and that a connection element 310a, 310b may directly connect two engagement bases 212. Such an embodiment will be described in detail hereinafter.

In particular, each connection element 310a, 310b comprises a plurality of tubular elements 311 that are parallel to each other. The plurality of tubular elements 311 and the two connection plates 400 form an articulated parallelogram.

Figure 10:
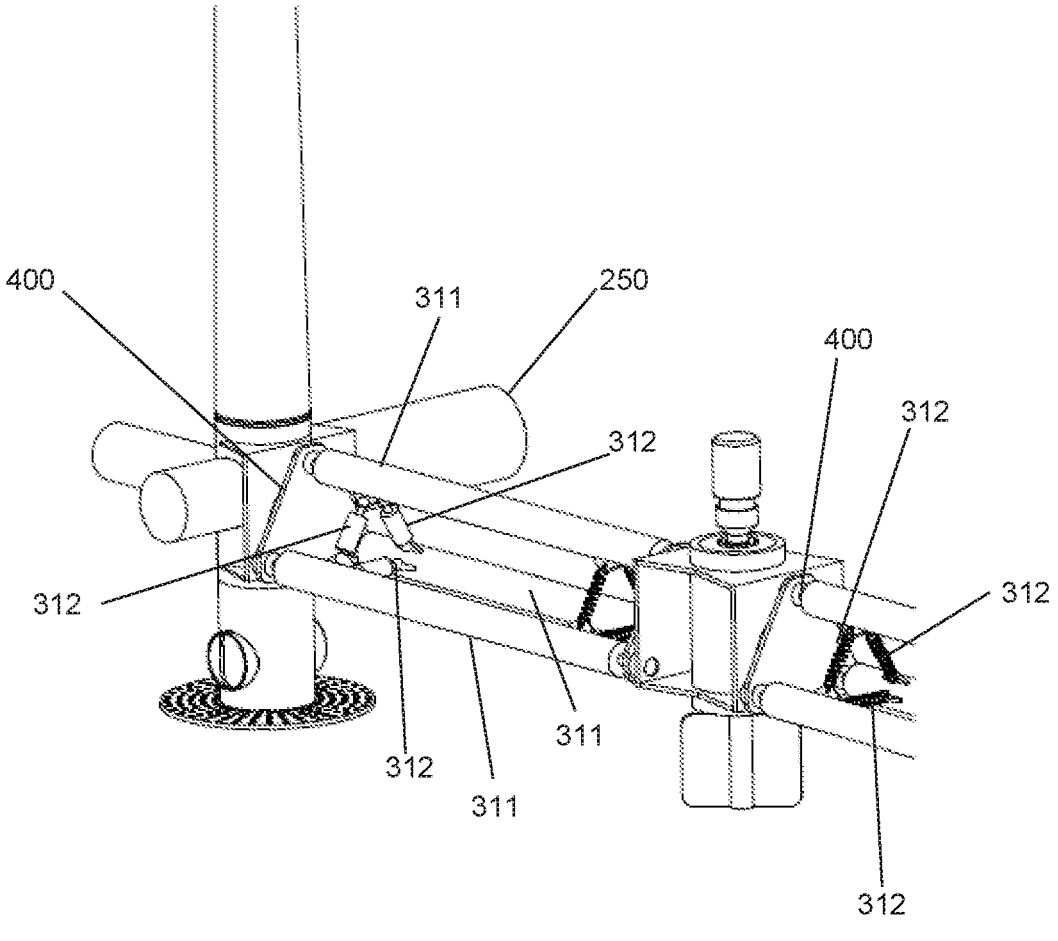
FIG. 10 is a detailed view of a connection section; in particular.

With reference to FIG. 10, preferably, each engagement base 210 further comprises a float 250. The floats 250 of different engagement bases 210 may preferably be different from one another and, optionally, may be partially or totally ballasted. The floats 250 make it possible to obtain the desired balancing of the forces acting upon the aeolian towers.

Each connection element 310a, 310b comprises at least two, e.g. three, mutually parallel tubular elements 311.

As aforementioned, each tubular element 311 is engaged, at a respective end, with a connection plate 400. For example, as shown in FIGS. 3, 4 and 10, each tubular element 311 is engaged, at a first end, with a first connection plate 400 and, at a second end, with a second connection plate 400. In particular, each tubular element 311 is engaged with a connection plate 400 by means of: a hinge or a ball joint or a cardan joint.

The Applicant observes that the hinge, the ball joint or the cardan joint are so designed and installed as to allow each tubular element 311 to move in a plane in which the axis of longitudinal development of an aeolian tower 210 lies.

Preferably, the tubular elements 311 of a respective connection element 310a, 310b are mutually connected by means of respective elastic elements 312. As shown in FIG. 10, preferably, the elastic elements may be: traction springs, spring cylinders, hydraulic, pneumatic or electric cylinders.

Figure 9:
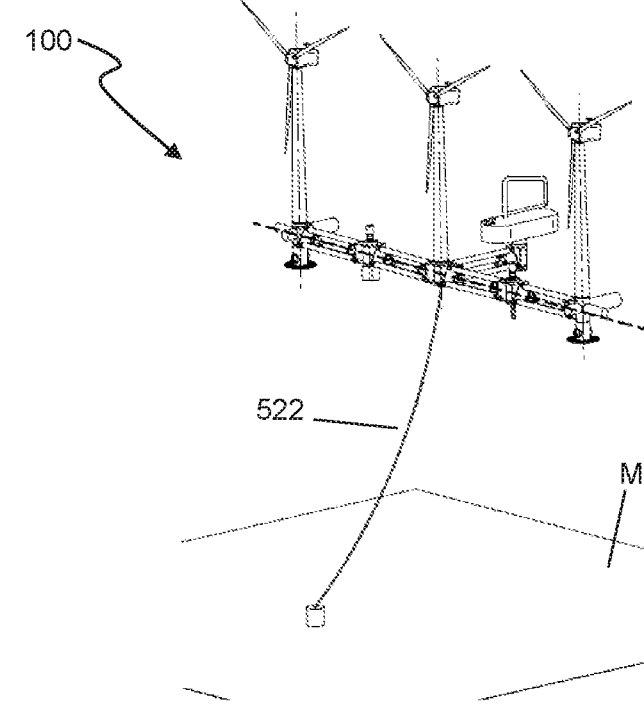
FIG. 9 is a perspective view of a further anchoring system of a platform according to the present invention.

Again with reference to FIGS. 2 and 9, the platform 100 further comprises an anchoring element 500. The anchoring element 500 is engaged with either an intermediate node 320 or an engagement base 212. The anchoring element 500 is adapted to anchor the platform to the sea floor (M).

Seafloor anchoring systems are known and will not be described in detail herein.

As shown in FIGS. 1 and 2, the anchoring element 500 preferably comprises:

a cylindrical main body 510;
a slewing ring 520, fitted onto said cylindrical main body 510;
a plurality of anchoring cables 522.

The slewing ring 520 comprises a plurality of hooking seats 521, each hooking seat 521 being adapted to engage a first end of a respective anchoring cable 522. The second end of each anchoring cable 522 is anchored to the sea floor M.

Figure 8:
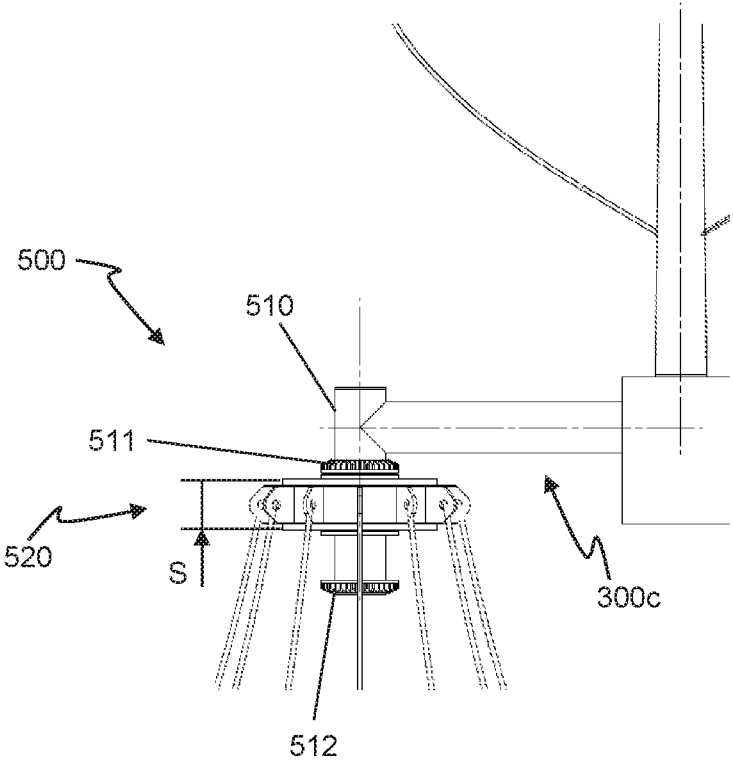
FIG. 8 is a side view of a platform according to a second embodiment of the present invention.

Preferably, as shown in FIG. 8, the cylindrical main body 510 further comprises an upper retainer 511 and a lower retainer 512. The upper retainer 511 and the lower retainer 512 delimit a portion of the main body along which the slewing ring 520 is free to slide. Preferably, a distance between the upper retainer 511 and the lower retainer 512 is 1.1 or 1.5 or 2 times greater than the thickness 3 of the slewing ring 520.

Figure 7:
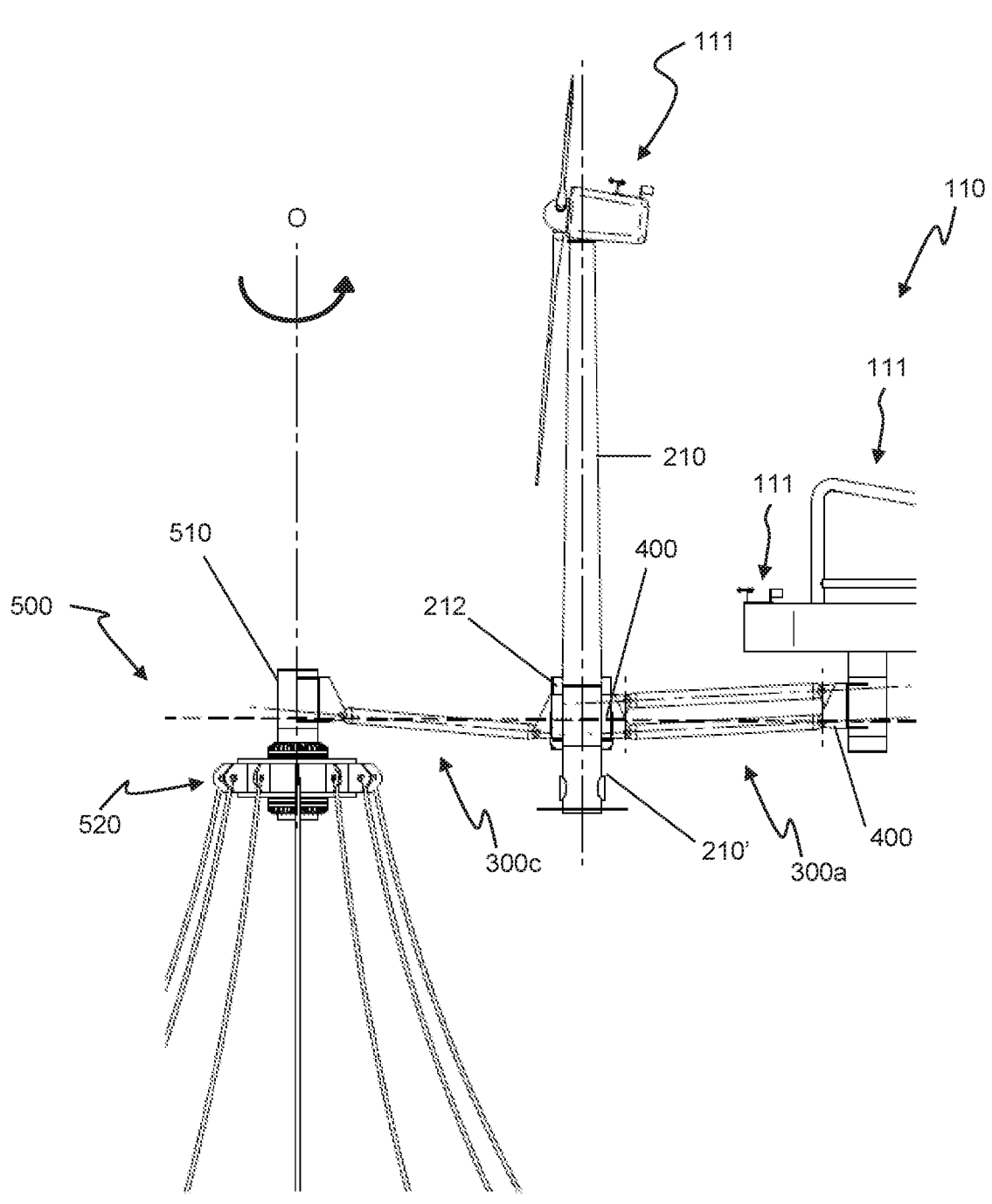
FIG. 7 is a side view of the platform of FIG. 1.

Preferably, the anchoring system is engaged with either an intermediate node 320 or an engagement base 212 by means of a connection section 300c, which is also an articulated parallelogram designed as previously described herein, i.e. consisting of a plurality of parallel tubular elements 311, each tubular element being fastened to two connection plates 400. Or, for example, as shown in FIGS. 1 and 7, said connection section 300c consists of two tubular elements 311 fastened, at one end thereof, to the cylindrical body 510 and, at the other end, to the engagement base 212 of an aeolian tower 210.

Alternatively, as shown in FIG. 8, the connection section 300c may consist of a rigid member, e.g. a tubular shaft.

Figure 5:
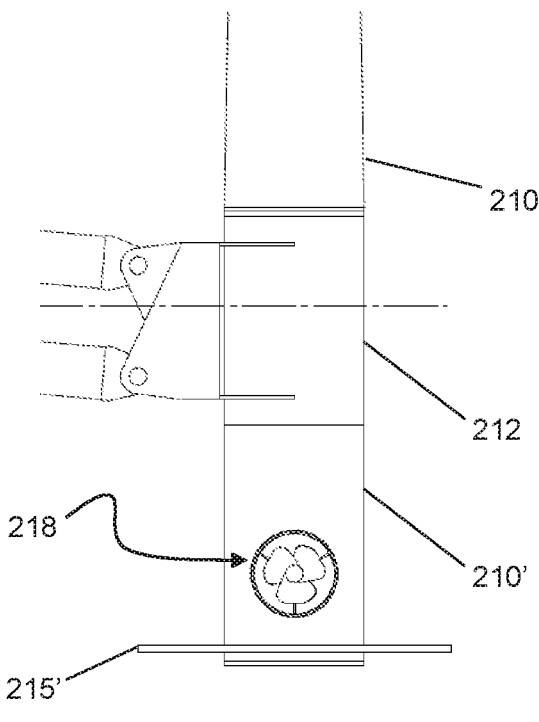
FIG. 5 is a magnified view of a detail of FIG. 2, showing a motor positioned under the sea level and inserted under an aeolian generator.
Figure 6:
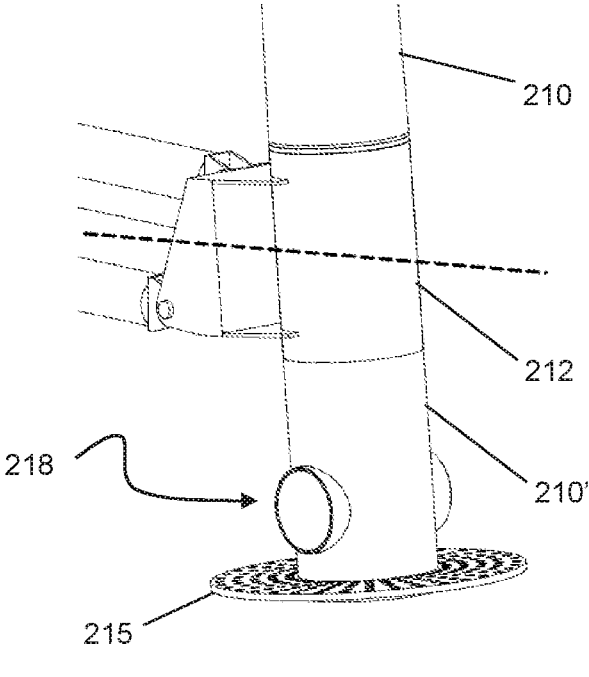
FIG. 6 is a perspective view of FIG. 5, showing a damping element inserted under an aeolian generator.

With reference to FIGS. 5 and 6, preferably, each aeolian tower 210 extends through the respective engagement base 212, presenting a lower portion 212'. The lower portion 212' is equipped with a damping element 215. The damping element 215 is designed as a perforated plate, preferably arranged perpendicular to the axis of longitudinal development of the respective aeolian tower 210.

Preferably, the lower portion 210' of at least one aeolian tower 210 comprises a motor 218, preferably a propeller engine; for example, two aeolian towers 210 comprise a respective motor 218 positioned at the lower portion 210' of the respective aeolian tower 210. In particular, the lower portion 210' has a hollow portion, which is substantially perpendicular to the axis of longitudinal development of the aeolian tower 210, within which an engine-driven propeller is housed.

With reference to FIGS. 2 and 4, according to a preferred embodiment, at least one intermediate node 320, e.g. two intermediate nodes 320, comprises a rudder 321 driven by means of an actuator 322. The actuator 322 may be, for example, an electric, hydraulic, pneumatic, linear or rotary actuator. For example, the actuator 322 is an electric motor coupled with a gear reducer housed within the body of the respective intermediate node 320.

With reference to FIGS. 1 and 7, the platform 100 preferably comprises also a control system 110.

The control system 110 comprises:

at least one wind direction sensor 111, e.g. an anemometer/wind vane or an orientable sail;
at least one processor configured for:
receiving information about the wind direction from said wind direction sensor 111;
controlling, based on said information, each actuator 322 and each propeller engine 218 in such a way as to orient the platform 100, by causing it to rotate about the anchoring centre O, as a function of the wind direction.

Preferably, the processor is contained in a box-shaped body engaged with either an intermediate node 320 or an aeolian tower 210. Even more preferably, said box-shaped body may contain all the auxiliary equipment and/or the systems for storing, converting and treating the produced energy, electrically connected to the aeolian generators 200.

Systems for storing, converting and treating produced energy are known and will not be described in detail herein.

Preferably, the at least one wind direction sensor 111 is positioned either on the box-shaped body of the control system 110 or on top of an aeolian tower 210. For example, respective anemometers/wind vanes are positioned at the top of the aeolian towers 210, and the orientable sail is positioned on the box-shaped body of the control system 110.

Preferably, as shown in FIG. 7, the box-shaped body is engaged with an aeolian tower 210 (or with an intermediate node 320) by means of a further connection element 300*a* and further connection plates 400, the further connection element 300*a* and the further connection plates 400 preferably forming an articulated parallelogram. The further connection element 300*a* comprising at least two tubular elements that are parallel to each other, e.g. three tubular elements mutually connected as described above. For example, the box-shaped body has, at its bottom, a support comprising a connection plate 400, said connection plate 400 being connected to at least two tubular elements by means of respective hinges or ball joints or cardan joints that connect a first end of each tubular element; the second end of each one of such tubular elements is engaged, by means of further respective hinges or ball joints or cardan joints, with a connection plate 400 of either an aeolian tower 210 or an intermediate node 320.

Preferably, each tubular element 311 and each intermediate node 320 are made of steel and are internally hollow, so as to be floating. Preferably, the volume and the inner cavity of each tubular element 311, each intermediate node 320 and each float 250 (if present) are so sized as to be able to support, in navigation, their own weight and the weight of the plurality of aeolian generators 200, as well as the weight of all accessories required to ensure the proper operation of the whole system.

According to an alternative embodiment (not shown), connection section 300 that joins two aeolian generators 210 may be constructed as a plurality of parallel tubular elements 311, e.g. two tubular elements 311 or three tubular elements 311. The length of each tubular element 311 is greater than two times the length of a blade of an aeolian generator 200.

Each tubular element 311 is engaged, at its first end, with an engagement base 212 of a first aeolian tower 210 and, at its second end, with an engagement base 212 of a second aeolian tower 210.

In particular, each tubular element 311 is engaged, at the respective ends, with two connection plates 400 by means of: a hinge or a ball joint or a cardan joint.

In other words, at least two tubular elements 311 and the two connection plates 400 form an articulated parallelogram that allows the two aeolian towers 210 to move independently in a substantially vertical direction, following the wave motion.

Preferably, the plurality of tubular elements 311 that join adjacent aeolian towers 210 are mutually connected by means of respective elastic elements 312, the elastic elements being preferably selected among: traction springs, spring cylinders, hydraulic, pneumatic or electric cylinders.

The Applicant observes that a platform 100 may include connection sections 300 joining two aeolian towers 210 consisting solely of a plurality of tubular elements 311, as described above, or consisting of two successive connection elements 310*a*, 310*b* mutually connected by means of an intermediate node 320. The Applicant observes that, when using one intermediate node 320 to connect two aeolian towers 210, it will be necessary to employ tubular elements 311 having a length which is greater than the length of the blades of the aeolian generator 200, so as to avoid any contact between the blades of adjacent aeolian generators 200. On the contrary, when using a plurality of intermediate nodes 320, the length of the tubular elements 311 employed may be equal to or shorter than the blade length.

The invention claimed is:

1. An offshore floating platform comprising:
a plurality of aeolian generators, each aeolian generator comprising: an aeolian tower having a longitudinal extension and provided with a first and a second end; a blade-type aeolian generator positioned at a first end; an engagement base positioned at the second end;
a connection section, which joins two aeolian generators, comprising at least one connection element;
wherein each engagement base is engaged with the connection element, in such a way that each aeolian tower can move independently in a direction substantially parallel to the axis of longitudinal development of an aeolian tower;
wherein each connection section further comprises at least one intermediate node;
each intermediate node being engaged with two successive connection elements;
wherein each intermediate node is free to move in a direction substantially parallel to the axis of longitudinal development of an aeolian tower in a manner substantially independent of the substantially vertical movement of another intermediate node and/or of an aeolian tower;
wherein each connection element is engaged, by a respective connection plate, with:
either an intermediate node or an engagement base at a first end; and
either a further intermediate node or a further engagement base at a second end;
wherein each connection element comprises a plurality of tubular elements that are parallel to each other;
wherein the plurality of tubular elements and the connection plates form an articulated parallelogram;
wherein each connection element comprises at least two tubular elements that are parallel to each other;
wherein each tubular element is engaged, at one end thereof, with a connection plate by a hinge.

2. The platform according to claim 1, wherein the tubular elements of a respective connection element are mutually connected by respective elastic elements.

3. The platform according to claim 2, wherein said platform further comprises an anchoring element, engaged with one end of a connection section, the anchoring element being adapted to anchor the platform to the sea floor (M).

4. The platform according to claim 2, wherein:
at least one intermediate node comprises a rudder driven by an actuator;
the bottom portion of at least one aeolian tower is equipped with a propeller engine;
the platform further comprising a control system comprising:
at least one wind direction sensor;
at least one processor configured for:
receiving information about the wind direction from said wind direction sensor;
controlling, based on said information, each actuator and each propeller engine in such a way as to orient the platform, by causing it to rotate about the anchoring centre (O), as a function of the wind direction.

5. The platform according to claim 2, wherein the elastic elements are selected among: traction springs, spring cylinders, or hydraulic, pneumatic or electric cylinders.

6. The platform according to claim 1, wherein said platform further comprises an anchoring element, engaged with one end of a connection section, the anchoring element being adapted to anchor the platform to the sea floor.

7. The platform according to claim 6, wherein:

at least one intermediate node comprises a rudder driven by an actuator;

the bottom portion of at least one aeolian tower is equipped with a propeller engine;

the platform further comprising a control system comprising:

at least one wind direction sensor;

at least one processor configured for:

receiving information about the wind direction from said wind direction sensor;

controlling, based on said information, each actuator and each propeller engine in such a way as to orient the platform, by causing it to rotate about the anchoring centre (O), as a function of the wind direction.

8. The platform according to claim 1, wherein:

at least one intermediate node comprises a rudder driven by an actuator;

the bottom portion of at least one aeolian tower is equipped with a propeller engine;

the platform further comprising a control system comprising:

at least one wind direction sensor;

at least one processor configured for:

receiving information about the wind direction from said wind direction sensor;

controlling, based on said information, each actuator and each propeller engine in such a way as to orient the platform, by causing it to rotate about the anchoring centre (O), as a function of the wind direction.

* * * * *